W. J. WILSON.
Street-Cars.

No. 153,412. Patented July 21, 1874.

WITNESSES
Robert Everett
George E. Upham

INVENTOR
Walstein J. Wilson
BY Chipman Hosmer & Co
ATTORNEYS

UNITED STATES PATENT OFFICE.

WALSTEIN J. WILSON, OF TONICA, ILLINOIS.

IMPROVEMENT IN STREET-CARS.

Specification forming part of Letters Patent No. 153,412, dated July 21, 1874; application filed June 6, 1874.

*To all whom it may concern:*

Be it known that I, WALSTEIN J. WILSON, of Tonica, in the county of La Salle and State of Illinois, have invented a new and valuable Improvement in Devices for Opening and Shutting Doors; and I do hereby declare that the following is a full, clear, and exact description of the construction and operation of the same, reference being had to the annexed drawings making a part of this specification, and to the letters and figures of reference marked thereon.

Figure 1:
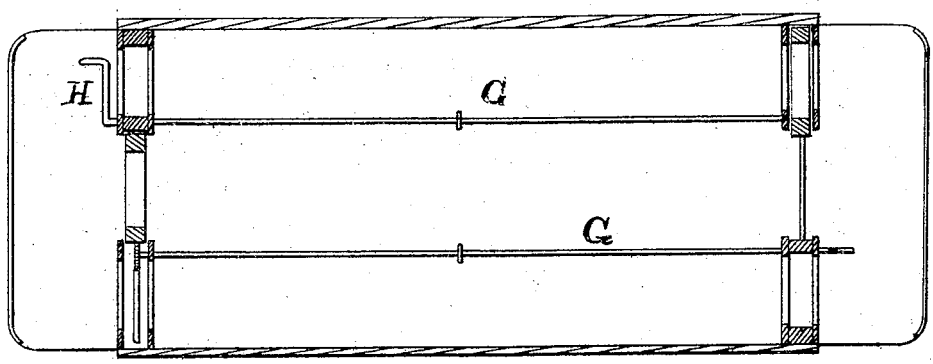
Figure 2:
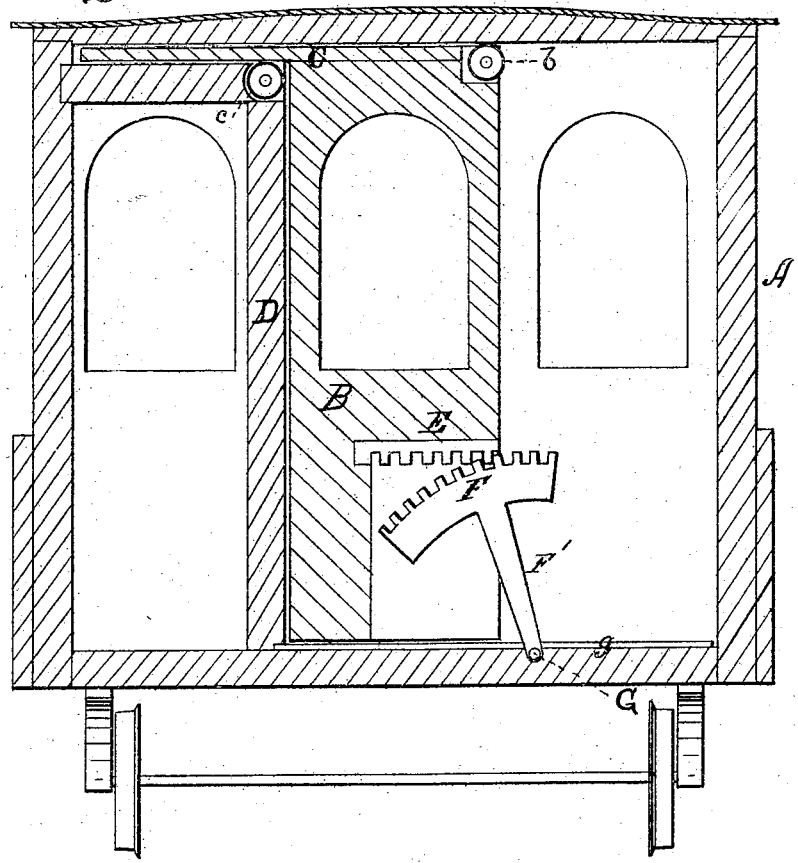

Figure 1 of the drawing is a representation of a plan view of my device, and Fig. 2 is a sectional view.

This invention has relation to means whereby a car or vehicle door may be opened or closed by the driver at the front thereof; and it consists in a ratchet-plate applied upon a door, which is adapted to be worked by a toothed segment, which is rigidly secured to an actuating-bar passing longitudinally from one end to the other of a car or vehicle, and operated by a driver upon the top or front platform of a car or vehicle.

In the annexed drawings, A designates a street-car, which is provided with a sliding door, B. Upon the upper edge of the door I attach a bar, C, which moves to and fro as the door is moved over a friction-pulley, c, arranged at the top of the upright D of the door-frame, against which the door B abuts when it is closed. The upper angle of the edge of this door, which is opposite to that on which the bar C is extended, is provided with a friction-pulley, b, which prevents all unnecessary friction of said edge upon the carline, or other transverse beam, of the car-body serving the same purpose. The door B is grooved to afford a rest for a metallic guide, g, which is fixed transversely upon the floor of a car or vehicle at the threshold thereof. This guide I do not intend to bear any portion of the weight of said door, as I have otherwise sustained the weight thereof; but I prevent any inward or outward displacement caused by jarring or wind. E designates a horizontal tooth-rack, which is applied to door B, across the length thereof, and which may be of any desired length not exceeding the width of the door. F is a segmental rack having an arm, F', which is in the same plane with the radius of the circular segment F, and into the lower end of which a perforation is made, which serves to receive the end of a shaft, G, which runs horizontally the whole length of the car or vehicle, and which finds bearings in a groove in the floor of said car or vehicle, and is held therein by suitable clamps. Shaft G is provided at its front end with an actuating hand-lever, H, which is conveniently inclined to be worked by the driver, who may be upon the platform or top of a car or vehicle, and by means of which a rotary motion is given to shaft G, and thence communicated to the segmental rack F, which gives a horizontal transverse movement to the rack E upon the door, and which causes the said door to be opened or closed, as may be desired.

In practice, I have applied the rack E and its segmental rack F in a deep groove in the door; but they may be applied to the outside or inside of the said door, in which latter case I prefer to conceal them by a suitable lining. I have also placed my actuating-shaft G upon the floor of the car; but I may apply it under the car-floor, when it will be supported in suitable bearings, the arm F' being continued through the platform to connect therewith. I have also made the arm F' of the segmental rack of such length that it shall, when it is engaged with the rack-plate E, sustain the weight of the door; but I may allow said door to receive its support entirely from the guide g, should it prove desirable, and both entrances may be supplied with the above-described device for opening and shutting the doors.

What I claim as new, and desire to secure by Letters Patent, is—

1. The combination, with the sliding car-door B, of a toothed rack, E, and segmental rack F, as specified.

2. The combination, with the rack E and segmental rack F, of a shaft, G, and actuating-lever H, to operate a car-door, as set forth.

In testimony that I claim the above I have hereunto subscribed my name in the presence of two witnesses.

WALSTEIN J. WILSON.

Witnesses:
HENRY GUNN,
NATHANIEL RICHEY.